US007006880B2

(12) United States Patent  
Ekberg

(10) Patent No.: US 7,006,880 B2  
(45) Date of Patent: Feb. 28, 2006

(54) METHOD FOR CONTROLLING A DEVICE WITH A CONTROL SYSTEM

(75) Inventor: Gregg Ekberg, Atlanta, GA (US)

(73) Assignee: Phred, LLC, Las Gatos, CA (US)

( * ) Notice: Subject to any disclaimer, the term of this patent is extended or adjusted under 35 U.S.C. 154(b) by 261 days.

(21) Appl. No.: 10/418,564

(22) Filed: Apr. 17, 2003

(65) Prior Publication Data

US 2003/0200000 A1    Oct. 23, 2003

Related U.S. Application Data

(60) Provisional application No. 60/319,194, filed on Apr. 19, 2002.

(51) Int. Cl.  
*G05B 9/02* (2006.01)

(52) U.S. Cl. ............................ 700/80; 700/69; 700/79; 700/96; 700/9

(58) Field of Classification Search ................. 700/83, 700/9, 69, 79, 96, 95, 169, 18, 110, 17, 19; 318/685  
See application file for complete search history.

(56) References Cited

U.S. PATENT DOCUMENTS

| 5,469,361 | A | 11/1995 | Moyne |
| 5,774,364 | A | 6/1998 | Kamps |
| 5,926,385 | A | 7/1999 | Lee |
| 5,997,167 | A | 12/1999 | Crater et al. |
| 6,201,996 | B1 * | 3/2001 | Crater et al. .................... 700/9 |
| 6,347,253 | B1 | 2/2002 | Fujita et al. |
| 6,349,237 | B1 | 2/2002 | Koren et al. |
| 6,563,285 | B1 * | 5/2003 | Eade et al. .................. 318/685 |
| 6,819,960 | B1 * | 11/2004 | McKelvey et al. ........... 700/17 |
| 2002/0156548 | A1 | 10/2002 | Arackaparambil et al. |
| 2003/0002333 | A1 | 1/2003 | Birkle |
| 2003/0040814 | A1 | 2/2003 | Moebius et al. |

OTHER PUBLICATIONS

IEEE 100 The Authoritative Dictionary of IEEE Standards Terms, Seven Edition, 2000.*

* cited by examiner

Primary Examiner—Anthony Knight  
Assistant Examiner—Sunray Chang  
(74) Attorney, Agent, or Firm—Howard & Howard

(57) ABSTRACT

A method for controlling at least one device (12) with a control system (10). The devices (12) can provide input signals (16) to the control system (10), receive output signals (14) from the control system (10) to operate the device (12), or a combination of both. When the device (12) is first connected to the control system (10), the control system (10) identifies the device (12) and selects a set of parameters and instructions from a database (18). An operator can then select values for the parameters. The parameters and instructions then define the operation of the device (12). Each controlled device (12) acts autonomously with respect to other devices (12). When the device (12) is actuated through a series of operations, the method determines the next operation of the device (12), after the device (12) has been turned off and back on again.

9 Claims, 2 Drawing Sheets

METHOD FOR CONTROLLING A DEVICE WITH A CONTROL SYSTEM

This Application claims the benefit of Provisional Application No. 60/319,194 filed Apr. 19, 2002.

BACKGROUND OF THE INVENTION

1. Field of the Invention

The subject invention relates to a method for controlling a device with a control system, particularly in the field of manufacturing or process control.

2. Description of the Prior Art

Various control systems and methods for controlling devices are known in the prior art. One example of such a control system is disclosed in U.S. Pat. No. 6,201,996. Specifically, the '996 patent discloses a controller with an object-oriented control structure. This control structure contains a database of templates. Each template provides device-specific information and instructions about devices connected to the control system. The devices connected to the control system are able to perform a series of steps in accordance with the instructions for the device.

An example of a method for controlling devices is disclosed in U.S. Patent Application Publication No. 2003/0040814. The '814 application discloses a method for the control of mechanisms and technical systems. In particular, the method discloses a process for identifying a state of the devices by comparing sensor signals to desired signals for the device. If the sensor signals and desired signals are not the same, then a separate algorithm is processed.

Although a number of control systems and methods to control devices are known in the prior art, there remains an opportunity to provide a more robust system of controlling a sequence of operations for a device to result in easier setup and operation of the device.

SUMMARY OF THE INVENTION AND ADVANTAGES

The invention provides a method of controlling a device operably connected to a control system through a sequence of operations. The method comprises the steps of automatically sending a series of output signals to the device to operate the device through the sequence of operations, turning off the automatic sending of output signals, and manually operating the device to perform at least one manual operation, turning on the automatic sending of output signals. The method is characterized by sensing the last of the manual operations and restarting the automatic sending of output signals to continue the sequence of operations from the last manual operation regardless of the number of manual operations.

The method of the subject invention provides an advantage over the prior art by allowing the device to resume its automatic operation without having to reset the device or return the device to a "home" position. This results in less diagnostic work by operators of the devices of the control system. The device that is taken out of automatic operation can be easily and safely restarted with minimum disruption.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
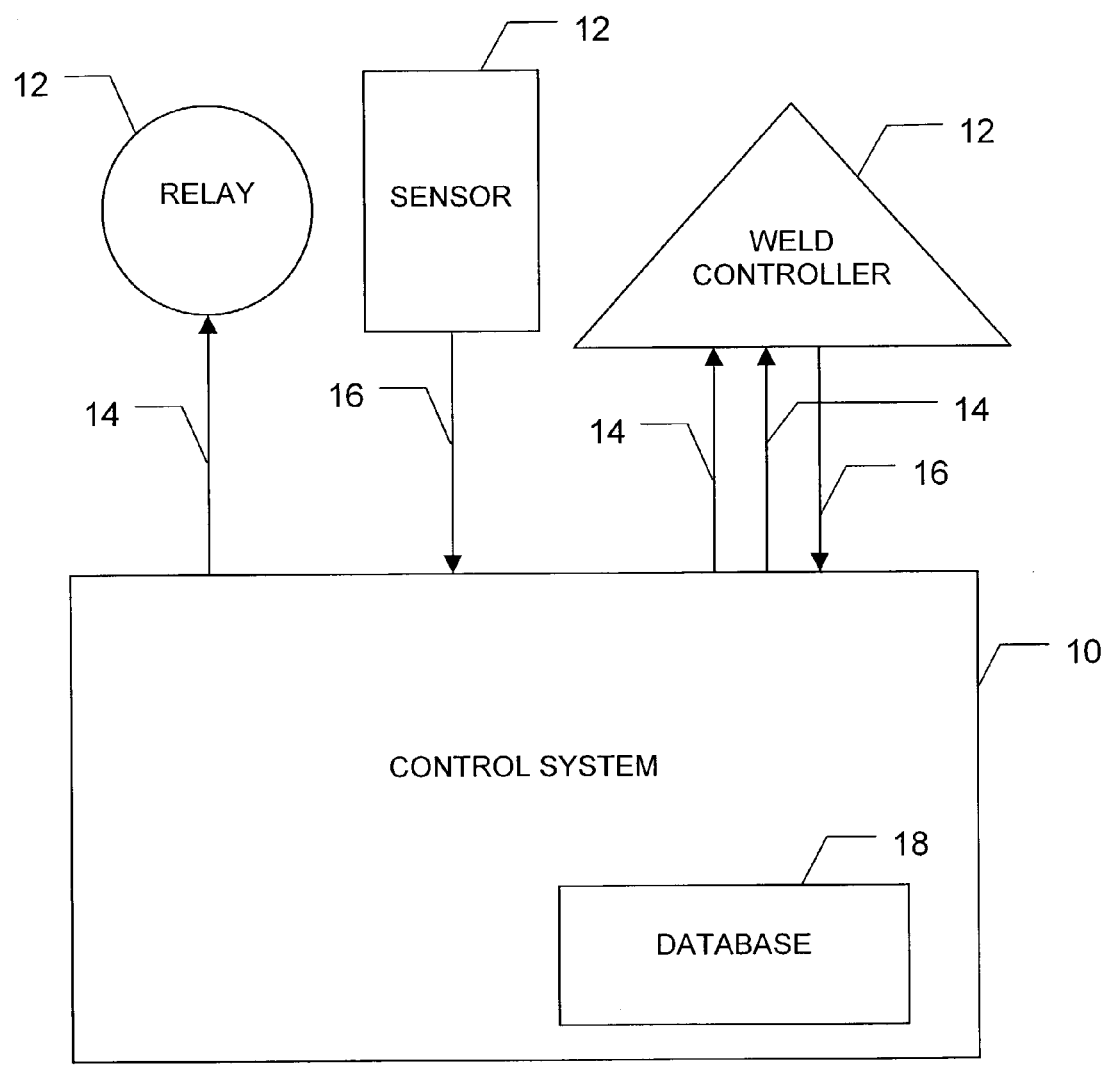
FIG. 1 is a block diagram of a control system with several devices operably connected to the control system.
Figure 2:
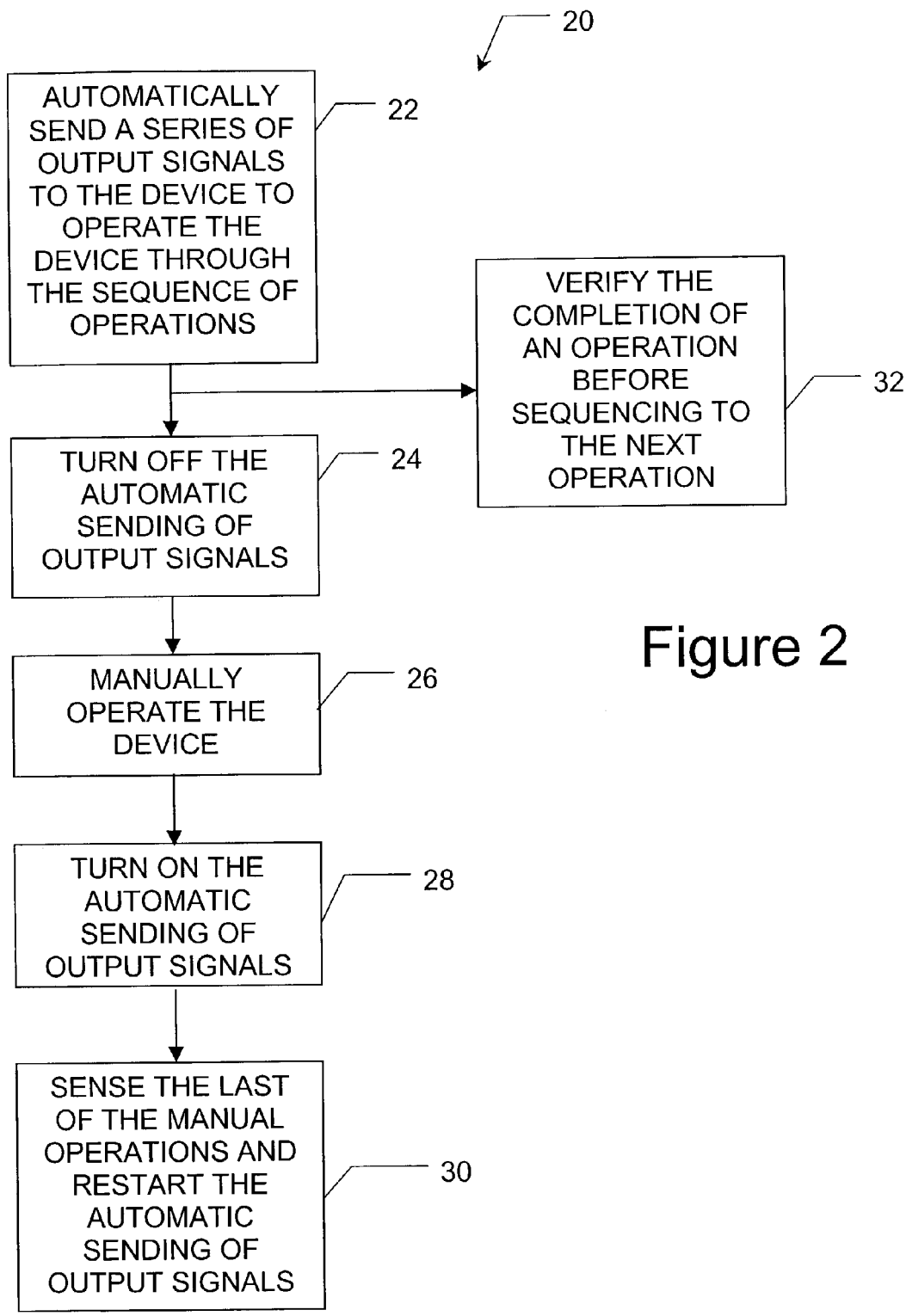
FIG. 2 is a block diagram illustrating a method of controlling one of the devices with the control system.

Referring to the Figures, wherein like numerals indicate like or corresponding parts throughout the several views, a method 20 of controlling a device 12 with a control system 10 is described herein. The device 12 is operably connected to the control system 10. Typically, a plurality of devices 12 are connected to the control system 10. These devices 12 may be controlled by at least one output signal 14 from the control system 10 and may provide at least one input signal 16 to the control system 10.

In the method 20 of the present invention, the control system 10 controls the device 12 through a sequence of operations. The device 12 could be any from a long list of manufacturing and process equipment that is commonly known in the art. For devices controlled by at least one output signal, this list includes, but is not limited to, electromechanical actuators, relays, solenoids, clamps, robots, motor drives, and valves. Additionally, devices providing at least one input signal 16 include, but are not limited to, switches, sensors, detectors, and pushbuttons. In the preferred embodiment, the sequence of operations are steps of instructions specific to the device 12 and stored electronically in the control system 10. Those skilled in the art will appreciate that the control system 10 may be physically centralized in a single unit or physically distributed among a plurality of units.

The method 20 begins with the step 22 of automatically sending a series of output signals to the device 12 to operate the device 12 through the sequence of operations. Those experienced in the art will understand that various devices 12 require different types of output signals 14. The output signal 14 generated by the control system 10 is either digital, also referred to as binary or discrete, or analog, also referred to as numerical. For example, relays or solenoids typically require digital outputs, while motor drives and multi-position valves typically require analog outputs.

Another step 32 of the method includes verifying the completion of an operation before sequencing to the next operation. Each device 12 in the control system 10 operates autonomously from the other devices 12, following the concepts of chaos theory. Those skilled in the art will acknowledge that other terms commonly used to describe chaos theory include, but are not limited to, autonomous agents, behavioral systems, complexity theory, or complex adaptive systems.

The method continues with the step 24 of turning off the automatic sending of output signals 14. Those skilled in the art will appreciate that this step will occur, for example, when the device 12 is transitioned from an automatic mode to a manual mode. Another example of this step occurs when power to the device 12 is lost or interrupted.

The next step 26 of the method is manually operating the device 12 to perform at least one manual operation. Again, those skilled in the art will realize that often when the device 12 is placed into the manual mode, or the power to the device 12 is interrupted, that the device 12 is manually operated. This manual operation may be to complete a function of the device, to move a piece of equipment connected to the device 12 thus allowing access by maintenance personnel, etc.

The method continues by the step 28 of turning on the automatic sending of output signals 14. Once the manual operation or operations are completed, the device 12 is returned to the automatic mode to resume its sequence of operations.

The method concludes with the step 30 of sensing the last of the manual operations and restarting the automatic sending of output signals 14 to continue the sequence of operations from the last manual operation regardless of the number of manual operations. When the automatic mode resumes, the control system 10 analyzes device-specific instructions in order to determine the next output signal 14 in the sequence of operations that should be sent to the device 12. The control system 10 does not need to keep a memory of the last output signal 14 that was sent before the device 12 was taken out of automatic mode. Nor does the control system 10 require that devices 12 be restarted from a designed step in the sequence of operations or returned to a "home" position. The control system 10 infers what the next output signal 14 in the sequence would be solely from at least one input signal 16 to the control system 10 and the device-specific instructions.

Setup of the control system 10 for operation is simple and utilizes plug-and-play concepts. This setup follows a three-part process.

The first part of the process is automatically detecting the device 12 in response to the device 12 being operably connected to the control system 10. When the device 12 is first connected to the control system 10, an exchange of communication occurs between the device 12 and the control system 10. This communication will provide information about the device 12 to the control system 10, including an identification of the device.

The second part of the process is the automatic retrieval of the sequence of operations and parameters for the device 12 from a database 18 in the control system 10 in response to the device 12 being automatically detected. The control system 10 contains the database of all devices 12 that have been approved for use with the control system 10. The database entry for each device 12 contains one or more sets of instructions for the device, depending on its required function. One or more of these sets of instructions may be the sequence of operations, depending on the device. The database entry also contains parameters for the device. These parameters include, but are not limited to, the type of device 12 (clamp, proximity switch, weld gun, etc.), a location name, a name of the device 12, and addresses of other devices 12 associated the device. Default values for the parameters are provided by the database 18.

The third part of the process is the step of receiving values for the parameters from an operator. If the default values for the parameters are not desired, the operator can change the values for the parameters. Once the three parts of the process are completed for all of the devices 12 connected to the control system 10, the control system 10 is ready to operate. No additional programming is necessary by an operator, since all instructions for each device 12 are preprogrammed and stored in the database of the control system 10.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method of controlling a device (12) operably connected to a control system (10) through a sequence of operations comprising the steps of:
   automatically sending a series of output signals (14) electronically from the control system (10) to the device (12) to operate the device (12) through the sequence of operations in an automatic mode;
   turning off the automatic sending of output signals (14) to take the device (12) out of the automatic mode;
   manually operating the device (12) to perform at least one manual operation;
   turning on the automatic sending of output signals (14);
   said method characterized by sensing the last of the manual operations and restarting the automatic sending of output signals (14) electronically from the control system (10) to the device (12) to continue the sequence of operations from the last manual operation regardless of the number of manual operations without keeping the last output signal (14) that was sent before the device (12) was taken out of the automatic mode.

2. A method as set forth in claim 1 further comprising the step of verifying the completion of an operation before sequencing to the next operation.

3. A method as set forth in claim 1 further comprising the step of automatically detecting the device (12) in response to the device (12) being operably connected to the control system.

4. A method as set forth in claim 3 further comprising the step of automatically retrieving instructions and parameters for the device (12) from a database (18) in the control system (10) in response to the device (12) being automatically detected.

5. A method as set forth in claim 4 further comprising the step of receiving values for the parameters from an operator.

6. A method as set forth in claim 1 further comprising the step of operating the device (12) through the sequence of the operation of other devices in response to automatically sending the series of output signals (14) electronically from the control system (10).

7. A method of controlling a device (12) with a control system (10) comprising the steps of:
   receiving at least one input signal (16) at the control system (10);
   connecting the device (12) to the control system (10);
   automatically retrieving instructions and parameters for operating the device (12) from a database (18) in the control system (10) in response to connecting the device (12) to the control system (12);
   automatically sending a series of output signals (14) to the device (12) electronically from the control system (10) to operate the device (12) in accordance with the instructions and the at least one input signal (16) to perform a sequence of operations in an automatic mode;
   stopping the automatic sending of output signals to take the device (12) out of the automatic mode; and
   restarting the automatic sending of output signals from the point at which the stoppage occurred without having to restart the sequence of operations and without keeping the last output signal (14) that was sent before the device (12) was taken out of the automatic mode.

8. A method as set forth in claim 7 further comprising the step of receiving values for the parameters of the device (12) from an operator.

9. A method as set forth in claim 8 wherein said step of automatically sending a series of output signals to the device (12) further comprises sending the values for the parameters to the device (12).

* * * * *